(12) United States Patent
Raisch (10) Patent No.: US 11,560,936 B2
(45) Date of Patent: Jan. 24, 2023

(54) SHIFT TRANSMISSION

(71) Applicant: Deere & Company, Moline, IL (US)

(72) Inventor: Stefan Raisch, Vaihingen (DE)

(73) Assignee: DEERE & COMPANY, Moline, IL (US)

( * ) Notice: Subject to any disclaimer, the term of this patent is extended or adjusted under 35 U.S.C. 154(b) by 35 days.

(21) Appl. No.: 16/903,455

(22) Filed: Jun. 17, 2020

(65) Prior Publication Data

US 2020/0408282 A1 Dec. 31, 2020

(30) Foreign Application Priority Data

Jun. 27, 2019 (DE) .......................... 102019209348.5

(51) Int. Cl.
*F16H 3/093* (2006.01)
*F16H 3/091* (2006.01)

(52) U.S. Cl.
CPC ............. *F16H 3/093* (2013.01); *F16H 3/091* (2013.01)

(58) Field of Classification Search
CPC .......... F16H 3/093; F16H 3/091; F16H 3/089; F16H 2003/0826
See application file for complete search history.

(56) References Cited

U.S. PATENT DOCUMENTS

| 7,166,049 B2 * | 1/2007 | Saller .................... B60W 10/02 475/5 |
| 2006/0142104 A1 * | 6/2006 | Saller .................... B60W 10/11 475/5 |
| 2008/0047380 A1 * | 2/2008 | Abramov ................ F16H 3/093 74/333 |

FOREIGN PATENT DOCUMENTS

| DE | 102017102579 A1 | 8/2018 |
| EP | 0745198 B1 | 8/1998 |
| WO | WO2008058858 A1 | 5/2008 |
| WO | WO2013064371 A1 | 5/2013 |

OTHER PUBLICATIONS

European Search Report issued in counterpart application No. 20181456.3 dated Nov. 4, 2020 (10 pages).

* cited by examiner

*Primary Examiner* — Victor L Macarthur (57) ABSTRACT

A shift transmission includes a first shaft, a second shaft arranged parallel to the first shaft, a gear group arranged at least partially on the first shaft, and a range group arranged at least partially on the second shaft. The gear group includes at least two gear units and the range group comprises at least three range units. Moreover, the gear group and the range group are configured such that a first and a second range unit in each case are shiftable with at least one gear unit indirectly by a third range unit.

6 Claims, 5 Drawing Sheets

SHIFT TRANSMISSION

RELATED APPLICATIONS

This application claims priority to German Patent Application Ser. No. 102019209348.5, filed Jun. 27, 2019, the disclosure of which is hereby incorporated by reference in its entirety.

FIELD OF THE DISCLOSURE

The present disclosure relates to a shift transmission, and in particular to a powershift transmission for agricultural machines.

BACKGROUND

Power shift transmissions are a specific type of vehicle transmission in which the gear ratio may be altered under load, i.e., during travel, without interrupting the torque. As a result, even during the shifting process propulsive forces may be transmitted so that the vehicle may accelerate forward even during the shifting process. Thus, during the shifting process there is no loss of driving comfort. Power shift transmissions are primarily used in agricultural utility vehicles, in particular in tractors, since they permit more rapid work such as when working in hilly terrain and on variable types of soil, and also help to save fuel. In addition, some tractor transmissions are only able to be partially power shifted, which means that it is only possible to shift between some gears without interrupting the tractive force, while others (for example, a group change) are associated with an interruption to the tractive force.

It is known to configure these transmissions in combination with planetary transmissions and clutches in a modular system so that the shift transmissions may be operated by a corresponding configuration and arrangement of gearwheel pairs of the planetary transmission in different operating modes, such as fixed drive mode, gear reduction mode and reversing mode. Thus, power shift transmissions are used on tractors, e.g., the agricultural machine manufacturer John Deere, as a preliminary transmission stage which, depending on the configuration of a stepped planetary set, may be operated either in the operating modes of fixed drive mode or reversing mode, or in the operating modes fixed drive mode or gear reduction mode.

In EP 0 745 198 B1, a power shift transmission for mobile working machines is disclosed, as well as a method for controlling this power shift transmission. In this case, hydraulic motors which are connected together via a clutch are used. In a low speed range the hydraulic motors are connected together in order to combine the torques. One of the hydraulic motors is reconfigured via a further clutch so that the hydraulic motors may be operated combined together at a rotational speed in an upper speed range.

A power shift transmission having an input shaft and an output shaft arranged coaxially thereto is disclosed in WO 2013/064371 A1. The power shift transmission has a planetary transmission set. The planetary transmission comprises a planet carrier which is connected to the input shaft. The first output shaft is able to be connected by a shift element to the sun of a stepped planetary set on the output side. The first output shaft is able to be connected directly to the input shaft by a second shift element. The sun gear of the stepped planetary set on the input side is connected fixedly in terms of rotation to a housing part of the power shift transmission.

Proceeding from this prior art, the present disclosure specifies a shift transmission which, on the one hand, is able to be implemented with a high number of gear variants, with at the same time a compact size, and which, on the other hand, is able to be used for a wide field of application.

SUMMARY

According to the present disclosure, a shift transmission has a first shaft and a second shaft arranged parallel thereto, wherein a gear group is arranged at least partially on the first shaft and a range group is arranged at least partially on the second shaft, wherein the gear group has at least two gear units and the range group has at least three range units and wherein the gear group and the range group are configured such that a first and a second range unit in each case are shiftable with at least one gear unit indirectly by incorporating a third range unit.

"Shiftable" is understood to mean in this context that a torque may be transmitted from the layshaft to the output shaft via the corresponding gear group and range group. This generally takes place by actuating shift elements, i.e., clutches, wherein in each case one clutch actuates the gear unit and a further clutch actuates the range unit. Each gear of the power shift transmission is thus defined, on the one hand, by the coupling-in of a gear unit and, on the other hand, by the coupling-in of a range unit, wherein according to the present disclosure each range unit is shiftable with each gear unit.

In principle, it lies within the scope of the present disclosure that the first and the second range unit are shiftable with all gear units indirectly by incorporating the third range unit. In this case, for example, the first and the second range units are connected in each case to the third range unit via a gearwheel arrangement and a layshaft.

In one embodiment of the present disclosure the gear group has at least three gear units.

However, another embodiment of the present disclosure provides that a first and a second range unit of the range group are only directly shiftable with in each case one gear group, while other gear groups are shiftable only by incorporating the third range unit. In such a case, the torque is transmitted from a gear group to the third range group and back again to the gear unit which is directly shiftable with the first or second range unit to be shifted. By means of such an embodiment, a compact constructional size may be achieved in a simple manner without a plurality of gearwheel pairs being required, generally the torque being transmitted thereby from the layshaft to the output shaft. At the same time, a shifting may be advantageously implemented for the relevant rotational speed range with as few transmission actions as possible, wherein each transmission action constitutes a loss of efficiency and accordingly a reduction in transmission actions is desired.

The first shaft may be configured directly as an input shaft and the second shaft as an output shaft. Via the input shaft, the shift transmission may be connected to a drive machine such as, for example, an internal combustion engine, so that the supplied torque may be transmitted via the shift transmission to the output shaft. Thus, a working machine or a drive shaft, for example, for wheels, may be attached to the output shaft.

In order to be able to configure the embodiment according to the present disclosure advantageously, the third range unit is arranged between the first and the second range unit. The first and the second range unit accordingly constitute the outer range units of the range group which are directly in engagement with outer gear units.

To this end, the gear units of the gear group have a coaxial shaft portion rotatably encompassing the first shaft and range units of the range group and a coaxial shaft portion rotatably encompassing the second shaft and in each case at least one gearwheel arranged on the coaxial shaft portion, wherein the gearwheels of the range units are in engagement with gearwheels of the gear units and wherein the coaxial shaft portions are configured to be coupled to the first shaft or the second shaft. Accordingly, each gear unit and each range unit consists of a coaxial shaft portion, at least one gearwheel and a shift element. The shift element may, for example, be a clutch, a claw shift or a synchronizing unit. If, for example, the shift element of the gear unit is actuated, the torque may be transmitted from the first shaft to the corresponding gear unit, so that as a result the gearwheels arranged on the coaxial shaft portion of the gear unit may be activated. The gearwheels of the gear unit are directly in engagement with one respective gearwheel of a range unit, so that as a result this range unit also rotates. As long as a shift element acts for this range unit, for example, a clutch is closed, the torque is transmitted from the coaxial shaft portion of the range unit to the second shaft.

Accordingly, the gear units which are directly in engagement with the first or the second range unit have two gearwheels, wherein in each case one of the gearwheels is in engagement with a gearwheel of the third range unit and the respective other gearwheel is in engagement with a gearwheel of the first or the second range unit. As a result, via the two gearwheels of the respective gear unit, a torque transmission may be transmitted from the third range unit to the first or second range unit.

So that all gear units may be shifted with all of the range units, the third range unit has a number of gearwheels which corresponds at least to the number of gear units. If, for example, the gear group has four gear units, accordingly four gearwheels are provided on the coaxial shaft portion of the third range unit. These gearwheels are in each case in engagement with a gearwheel of each gear unit. According to a conventional design, the gearwheels of the range units constitute secondary gearwheels or output gearwheels since a torque is transmitted from the gear units to the range units. Two of the gearwheels of the third range unit may, however, be configured by the design according to the present disclosure both as a drive gearwheel and an output gearwheel or as a primary and secondary gearwheel. In this case, it is the outer gearwheels of the third range unit which in each case are in engagement with a gearwheel of a gear unit which in turn is directly coupled to the first or the second range unit.

According to an alternative arrangement, it is also possible that at least one of the gear units is not arranged on the first shaft but on the second shaft. In such a case, a coaxial shaft portion of this gear unit rotatably encompasses a coaxial shaft portion of one of the range units, wherein the coaxial shaft portion of the gear unit is couplable to the coaxial shaft portion of the range unit. The range unit is the third range unit and the gear unit is a gear unit which is not directly in engagement with the first or second range unit. In such an embodiment, therefore, the second shaft, the coaxial shaft portion of the range unit, for example, the third range unit, and the coaxial shaft portion of the corresponding gear unit are arranged coaxially to one another, wherein the shift element of the range unit is arranged between the second shaft and the coaxial shaft portion of the range unit and the shift element of the gear unit is arranged between the coaxial shaft portion of the range unit and the coaxial shaft portion of the gear unit.

Moreover, a gearwheel is arranged on the coaxial shaft portion of the gear unit, the gearwheel being in engagement with a gearwheel arranged fixedly on the first shaft, so that this gearwheel pair is always driven when the first shaft rotates. A torque is transmitted to the coaxial shaft portion of the range unit, however, only when the shift element of the gear unit is closed.

In one development of the present disclosure, a third shaft is arranged parallel to the first and the second shaft and is connected via a shift group, for example, a Hi-Lo shift group, to the first or the second shaft, wherein the shift group is designed to increase or reduce the rotational speed. The third shaft may be arranged upstream of the first shaft or may be arranged downstream of the second shaft. If the third shaft is arranged upstream of the first shaft, the third shaft is the input shaft. In an arrangement downstream of the second shaft, the third shaft is configured as the output shaft.

The shift group consists of at least two different gearwheel pairs which differ from one another regarding their gear ratio. Both gearwheel pairs may be actuated independently of one another and accordingly have a separate assigned shift element.

Each of these gearwheel pairs consists of a primary gearwheel and a secondary gearwheel, wherein the primary gearwheel serves as a drive gearwheel and the secondary gearwheel serves as an output gearwheel. In an embodiment, the primary gearwheels are arranged on the first shaft and the secondary gearwheels are arranged on the second shaft. Alternatively, the primary gearwheels may also be arranged on the second shaft and the secondary gearwheels may be arranged on the third shaft.

So that the respective gearwheel pairs may be actuated via the shift element, at least either the primary gearwheel or the secondary gearwheel is arranged on a coaxial shaft portion which rotatably encompasses the input shaft or the layshaft. By actuating the shift element, the respective coaxial shaft portion is connected to the corresponding shaft so that, as a result, a torque is transmitted. The respective other gearwheel is accordingly fixedly connected to a further shaft.

In another embodiment, the primary gearwheel of the first gearwheel pair is arranged on a coaxial shaft portion which encompasses the third shaft and the secondary gearwheel of the second gearwheel pair is arranged on a coaxial shaft portion which encompasses the first shaft. Accordingly, the primary gearwheel of the first gearwheel pair is fixedly mounted on the third shaft and the secondary gearwheel of the second gearwheel pair is fixedly mounted on the first shaft.

In a development of the present disclosure, a reversing unit may also be integrated in the shift group so that, as a result, a reversal of the rotational direction takes place.

In a further development, a third gearwheel pair may also be configured in a similar manner to the first or second gearwheel pair, wherein the third gearwheel pair has a gear ratio which is different from the first and the second gearwheel pair.

The shift transmission according to the present disclosure may be operated with a different number of gear units and range units, in an exemplary embodiment with four gear units and three range units and also two gearwheel pairs in the shift group, resulting in a quantity of 24 gears.

If the number of range units is to be increased, this may be carried out, for example, by a fourth range unit being positioned on the second shaft, without the arrangement of the other range units being altered relative to one another. This fourth range unit is formed in a similar manner to the other range units from a coaxial shaft portion, a gearwheel and a shift element. The gearwheel is in engagement with a gearwheel mounted fixedly on an auxiliary shaft. Moreover, a further gearwheel is arranged on the auxiliary shaft, the gearwheel being in engagement with a gearwheel arranged on the coaxial shaft portion of the third range unit. Thus, a torque may be transmitted from the third range unit to the fourth range unit via two gearwheel pairs and an auxiliary shaft. A step-up or a step-down may also be implemented by the two gearwheel pairs.

Although the shift transmission is designed in its essential function to transmit a torque from an input shaft to an output shaft, working machines such as, for example, pumps, may be connected to all of the shafts so that a plurality of different machines may be operated at different rotational speeds and load states.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
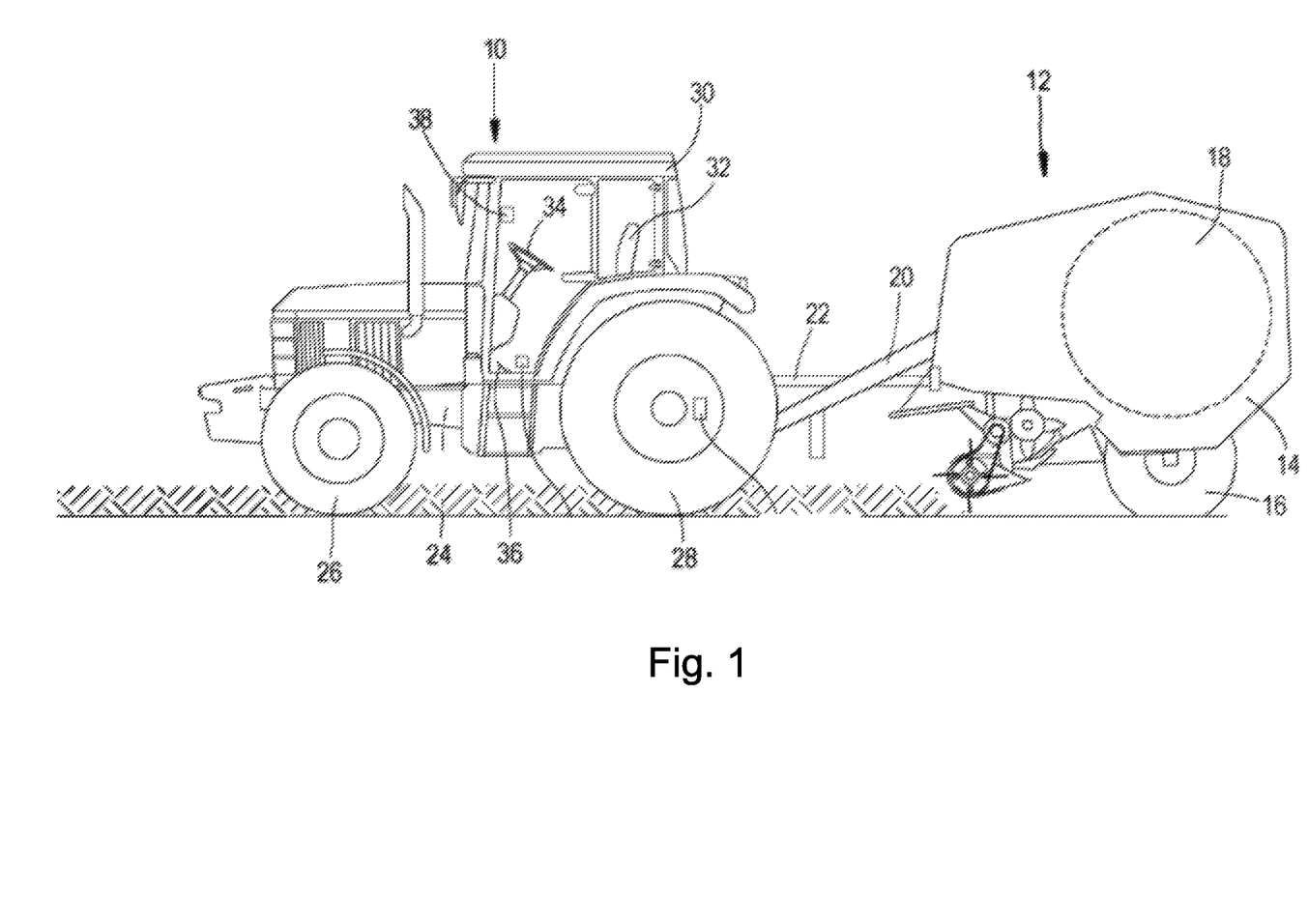
FIG. 1 shows a schematic view of an agricultural working machine.

FIG. 1 shows an agricultural working machine in the form of a tractor 10 and any device 12 which is pulled by the tractor and which is designed in the illustrated embodiment purely by way of example as a round baler. The device 12 comprises a chassis 14 supported on wheels 16, with a bale-forming chamber 18. The device 12 is pulled by the tractor 10 via a drawbar 20. The drivable elements thereof are driven by the tractor 10 by a power take-off shaft 22.

The tractor 10 comprises a chassis 24 which is supported on front steerable wheels 26 and rear driven wheels 28. An operator workstation with a seat 32 is located in a cab 30. A steering wheel 34, a gas pedal 36 and a control panel 38 may be actuated from the seat.

Figure 2:
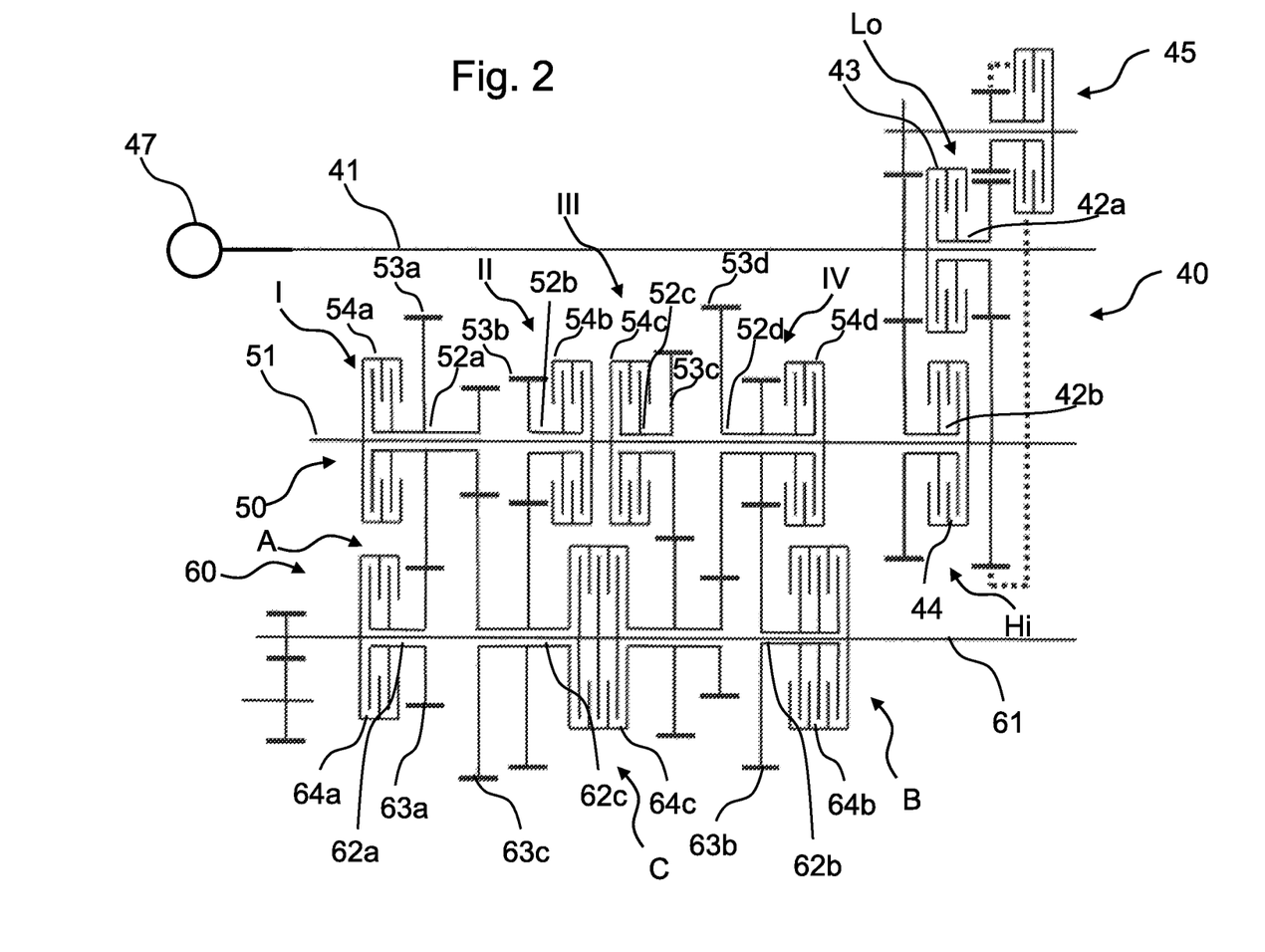
FIG. 2 shows a shift transmission according to the present disclosure according to a first variant.

FIG. 2 shows the shift transmission according to the present disclosure according to a first variant. The shift transmission has an input shaft 41, a layshaft 51 and an output shaft 61, wherein the layshaft 51 is arranged offset in parallel between the input shaft 41 and the output shaft 61 inside a housing.

The input shaft 41 is coupled directly to a drive machine 47, wherein the torque is transmitted from the drive machine 47 to the output shaft 61 via a shift group 40, a gear group 50 and a range group 60.

In this case, the shift group 40 is configured as a Hi-Lo shift group and arranged between the input shaft 41 and the layshaft 51, wherein by the shift group 40 different step-up or step-down ratios may be implemented between the input shaft 41 and the layshaft 51. This is carried out via a first gearwheel pair of the shift group Lo and a second gearwheel pair of the shift group Hi. In this case, the gearwheel pair Lo may be used in a low rotational speed range and the gearwheel pair Hi may be used in a high rotational speed range.

In order to be able to shift these individual gearwheel pairs Lo, Hi two shift elements in the form of clutches 43, 44, in the form of a multiplate clutch, are provided, wherein the clutch 43 couples-in the gearwheel pair Lo and the clutch 44 couples-in the gearwheel pair Hi. The gearwheel pair Lo consists of a coaxial shaft portion 42a and a gearwheel which is arranged on the coaxial shaft portion 42a and which cooperates with a gearwheel mounted fixedly on the layshaft 51. In contrast thereto, the second gearwheel pair Hi has a coaxial shaft portion 42b, on which a gearwheel cooperates with a gearwheel fixedly mounted on the input shaft 41.

Moreover, a reversing unit 45 via which the rotational direction of the layshaft 51 may be reversed is also provided.

In order to shift the individual gearwheel pairs of the shift group Lo, Hi, —as already described above—a clutch 43, 44 is actuated, the clutch coupling the coaxial shaft portion 42a, 42b to the corresponding input shaft 41 or the layshaft 51. As a result, the torque is transmitted from the drive machine 47 via the inner shaft 41 and the shift group 40 to the layshaft 51.

Starting from the layshaft 51, the torque is transmitted to the output shaft 61 via a gear group 50 and a range group 60. In this case, the range group 60 is configured such that a third range unit C may be directly shifted with all shift units I, II, III, IV of the gear group 50 and the first and the second range unit A, B of the range group 60 in each case may only be directly shifted via a gear unit I, IV of the gear group 50. In the example shown, the range unit A may be directly shifted with the gear unit I and the range unit B may be directly shifted with the gear unit IV. If the range units A, B are intended to be shifted with other gear units, this may be carried out only indirectly by incorporating the third range unit C.

In order to implement this, each gear unit I, II, III, IV of the gear group 50 has in each case a coaxial shaft portion 52a, 52b, 52c, 52d, a gearwheel 53a, 53b, 53c, 53d arranged on the coaxial shaft portion 52a, 52b, 52c, 52d and a shift element, a clutch 54a, 54b, 54c, 54d in the form of a multiplate clutch, via which the respective coaxial shaft portion 52a, 52b, 52c, 52d may be coupled to the layshaft 51.

The range group 60 is also configured in a similar manner thereto. The shift units A, B, C also have in each case a coaxial shaft portion 62a, 62b, 62c, a gearwheel 63a, 63b, 63c arranged in each case on the coaxial shaft portion 62a, 62b, 62c, and in each case a shift element, a multiplate clutch 64a, 64b, 64c, via which the respective coaxial shaft portion 62a, 62b, 62c may be coupled to the output shaft 61.

The third range unit C of the range group 60 has a total of four gearwheels 63c, wherein each gearwheel 63c is assigned to one of the gearwheels 53a, 53b, 53c, 53d of the gear units I, II, III, IV of the gear group 50 or with which they are in engagement. Accordingly, the number of gearwheels 63c of the third range unit C of the range group 60 is dictated by the number of shift units I, II, III, IV of the gear group 50.

The first range unit A of the range group 60 has just one gearwheel 63a which is connected to the gearwheel 53a of the first shift unit I of the gear group 50. Accordingly, the second shift unit B also has just one gear wheel 64b which is in engagement with a gearwheel 53d of the shift unit IV of the gear group 50.

By such an embodiment it is now possible that, for example, the fourth gear unit IV may also be shifted with the first range group A. To this end, the clutch 54d of the fourth gear unit IV is actuated, so that the torque of the layshaft 51 is firstly transmitted to the coaxial shaft portion and subsequently to the gearwheel 53d, which is in engagement with a gearwheel 63a of the third range unit C. Thus a torque is transmitted via the gearwheel 63c to the coaxial shaft portion 62c of the third range unit C. The clutch 64c in this case is not actuated so that the coaxial shaft portion 62c is uncoupled from the output shaft 61.

Via a further gearwheel 63c of the third range unit C a torque is now transmitted to the first gear unit I. Since at least two gearwheels 53a are arranged on the coaxial shaft portion 52a of the first gear unit I, the torque may be subsequently transmitted to the first range unit A. Similarly, the second range unit B may also be shifted via the first gear unit I, wherein the torque is then conducted via the third range unit C and the fourth gear unit IV. Moreover, a shifting of the first or the second range unit A, B via the second or third gear unit II, III always takes place via the third range unit C.

Figure 3:
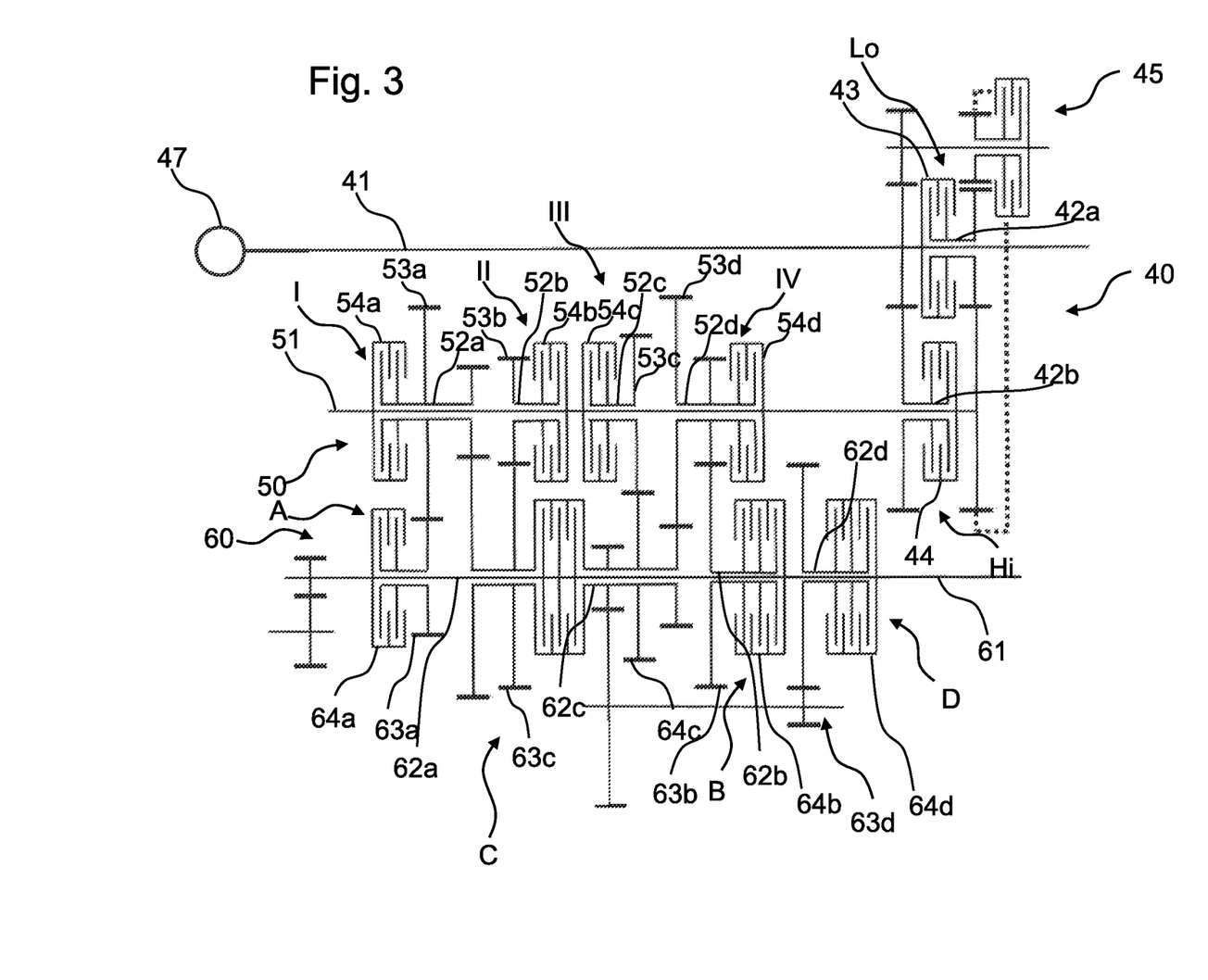
FIG. 3 shows an alternative embodiment of the shift transmission according to FIG. 1.

FIG. 3 shows an alternative embodiment of the shift transmission according to FIG. 2, wherein a fourth range unit D of the range group 60, which may also be shifted with each of the gear units I, II, III, IV of the gear group 50, is provided. The range unit D is arranged externally on the output shaft 61 and is connected via an apparatus 63d comprising two gearwheel pairs and an auxiliary shaft to the coaxial shaft portion 62c of the third range unit C of the range group 60. Via the two gearwheel pairs of the apparatus 63d a gear reduction is implemented between the coaxial shaft portion 62c of the third range unit C and the coaxial shaft portion 62d of the shift unit D.

Figure 4:
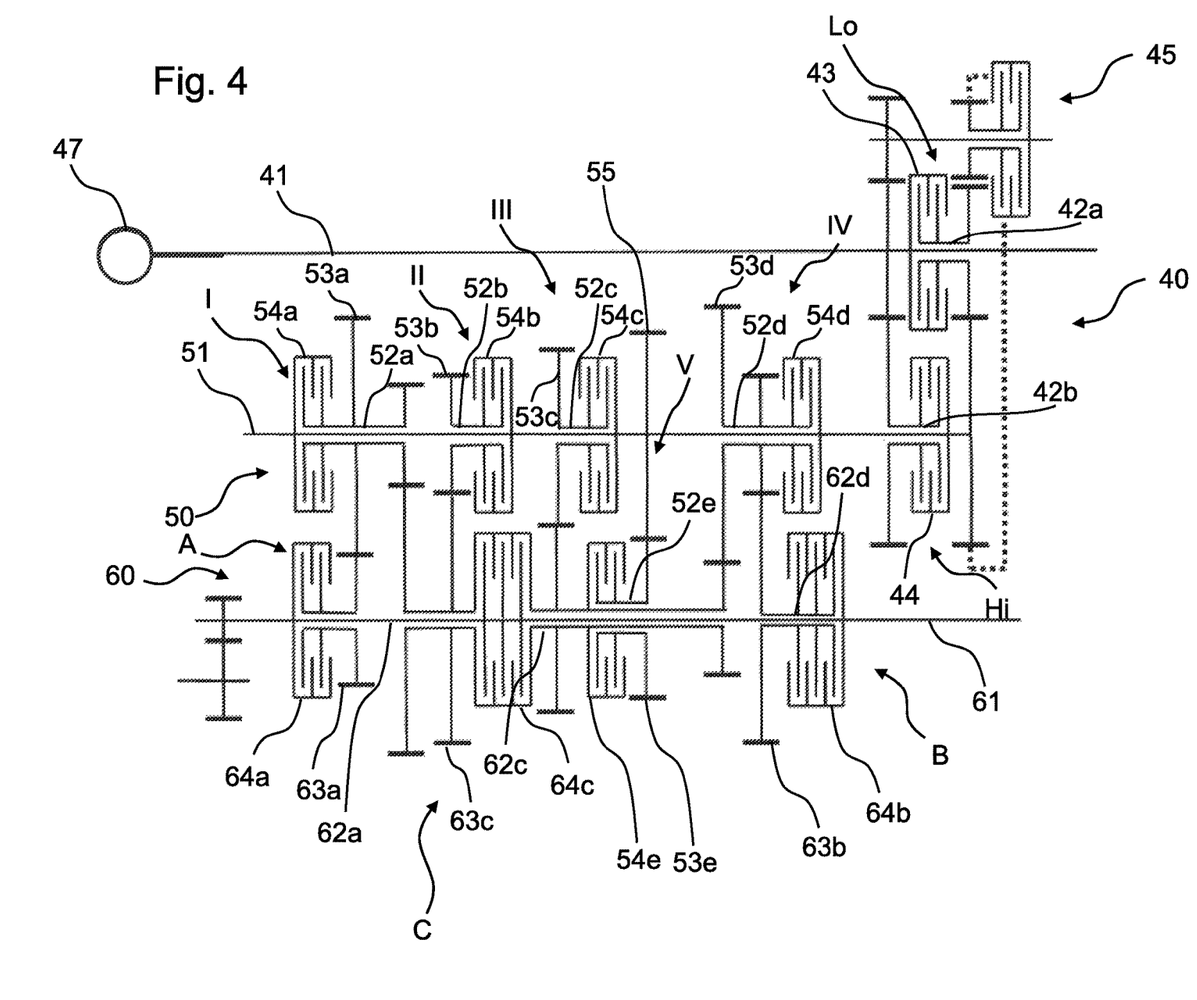
FIG. 4 shows an alternative embodiment of the shift transmission according to FIG. 1.

According to the variant of FIG. 4 a fifth gear unit V of the gear group 50 is now provided, wherein the gear unit V has a coaxial shaft portion 52e which encompasses both the output shaft 61 and the coaxial shaft portion 62c of the third range unit C of the range group 60. Thus, in principle the gear unit V of the gear group 50 is arranged on the output shaft 61 and not on the layshaft 51. A torque is transmitted from the layshaft 51 to the gear unit V by means of a gearwheel 55 which is mounted fixedly on the layshaft 51 and which is in engagement with a gearwheel 53e mounted on the coaxial shaft portion 52e. A coupling between the coaxial shaft portion 52e and the coaxial shaft portion 62c takes place by a clutch 54e.

Figure 5:
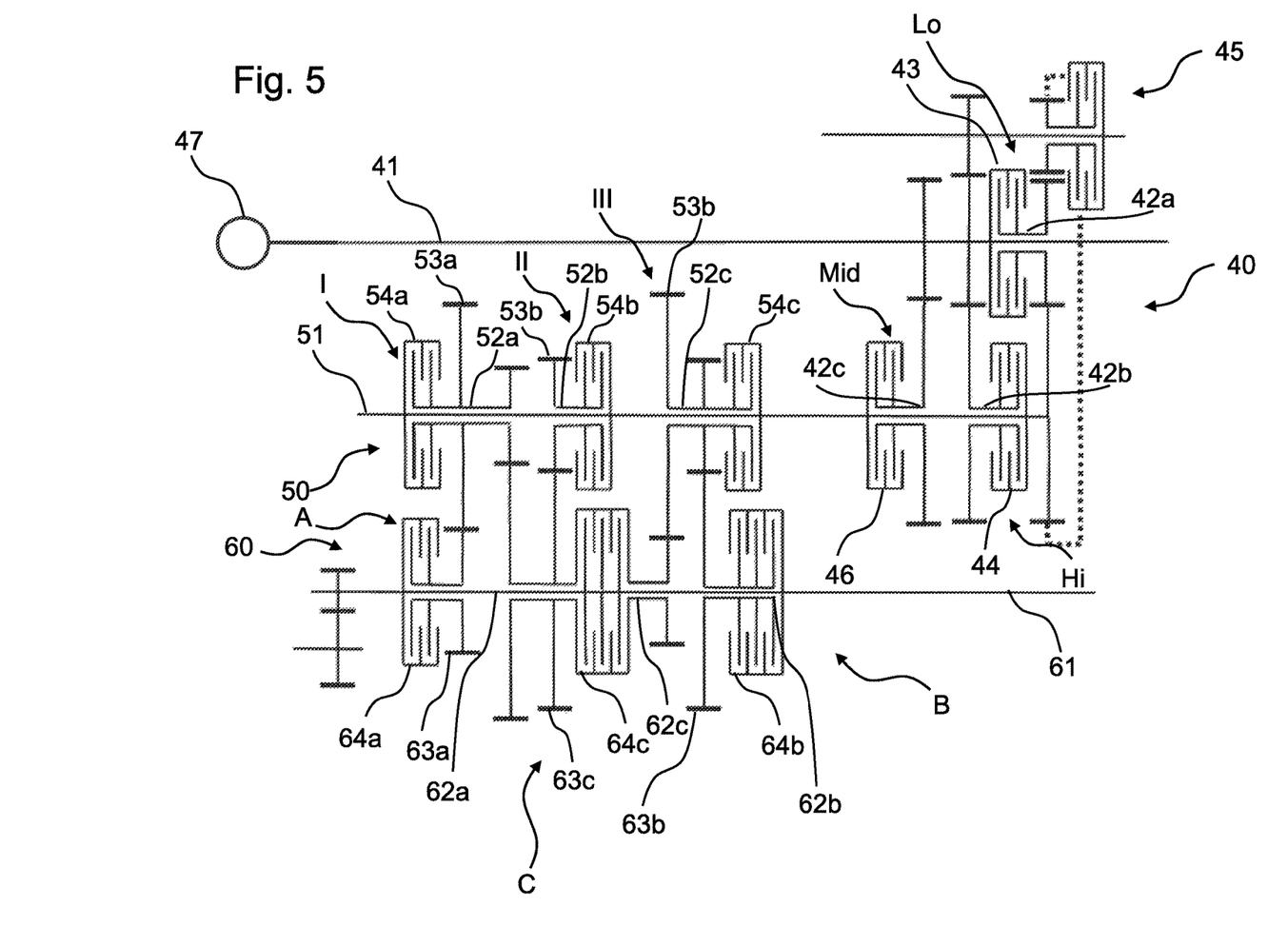
FIG. 5 shows an alternative embodiment of the shift transmission according to FIG. 1.

The variant shown in FIG. 5 substantially corresponds to the shift transmission according to FIG. 1, wherein the shift group 40 now has a third gearwheel pair Mid and accordingly is configured as a Hi-Mid-Lo shift group, wherein the third gearwheel pair Mid is able to be used in a mid-rotational speed range.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A shift transmission, comprising:
  a layshaft and an output shaft arranged parallel to the first shaft layshaft;
  an input shaft arranged parallel to the layshaft;
  a Hi-Lo shift group arranged between the input shaft and the layshaft, the Hi-Lo shift group including a Lo gearwheel pair, a Hi gearwheel pair, a Lo clutch, a Hi clutch, and a reversing unit;
  a first gear unit, a second gear unit, and a third gear unit arranged at least partially on the layshaft, the first gear unit including a first gearwheel, a second gearwheel, and a first clutch, the second gear unit including a third gearwheel, a fourth gearwheel, and a second clutch, and the third gear unit including a ninth gearwheel and a sixth clutch;
  the first gear unit including a first coaxial shaft portion rotatably encompassing the layshaft, the second gear unit including a second coaxial shaft portion rotatably encompassing the layshaft, and the third gear unit including a third coaxial shaft portion rotatably encompassing the layshaft;
  a first range unit, a second range unit, and a third range unit arranged at least partially on the output shaft, the first range unit including a fifth gearwheel and a third clutch, the second range unit including a sixth gearwheel and a fourth clutch, the third range unit including a seventh gearwheel, an eighth gearwheel, a tenth gearwheel, and a fifth clutch, and the third range unit arranged between the first and the second range units on the output shaft;
  the first range unit including a fourth coaxial shaft portion rotatably encompassing the output shaft, the second range unit including a fifth coaxial shaft portion rotatably encompassing the output shaft, and the third range unit including a sixth coaxial shaft portion rotatably encompassing the output shaft;
  when the Lo clutch is actuated, torque is transmitted from the input shaft to the layshaft shaft via the Lo gearwheel pair;
  when the Hi clutch is actuated, torque is transmitted from the input shaft to the layshaft shaft via the Hi gearwheel pair;
  when the first clutch and the third clutch are actuated, torque is transmitted from the layshaft to the output shaft via the first gearwheel in engagement with the fifth gearwheel;
  when the first clutch and the fifth clutch are actuated, torque is transmitted from the layshaft to the output shaft via the second gearwheel in engagement with the seventh gearwheel;
  when the second clutch and the fourth clutch are actuated, torque is transmitted from the layshaft to the output shaft via the third gearwheel in engagement with the sixth gearwheel;
  when the second clutch and the fifth clutch are actuated, torque is transmitted from the layshaft to the output shaft via the fourth gearwheel in engagement with the eighth gearwheel; and when the sixth clutch and the fifth clutch are actuated, torque is transmitted from the layshaft to the output shaft via the ninth gearwheel in engagement with the tenth gearwheel.

2. The shift transmission of claim 1, wherein the Hi-Lo shift group includes a Mid gearwheel pair and a Mid clutch, and when the Mid clutch is actuated, torque is transmitted from the input shaft to the layshaft shaft via the Mid gearwheel pair.

3. The shift transmission of claim 1, further comprising:
a fourth gear unit arranged at least partially on the layshaft, the fourth gear unit including an eleventh gearwheel and a seventh clutch;
the third range unit including a twelfth gearwheel;
when the seventh clutch and the fifth clutch are actuated, torque is transmitted from the layshaft to the output shaft via the eleventh gearwheel in engagement with the twelfth gearwheel.

4. The shift transmission of claim 3, wherein the fourth gear unit includes a seventh coaxial shaft portion rotatably encompassing the layshaft.

5. The shift transmission of claim 3, further comprising:
a fourth range unit arranged at least partially on the output shaft, the fourth range unit including a thirteenth gearwheel and an eighth clutch;
the third range unit including a fourteenth gearwheel;
a fourth shaft including a fifteenth gearwheel and a sixteenth gearwheel;
wherein the thirteenth gearwheel and the fifteenth gearwheel form a first gearwheel pair, and the fourteenth gearwheel and the sixteenth gearwheel form a second gearwheel pair.

6. The shift transmission of claim 3, further comprising:
a fifth gear unit arranged at least partially on the output shaft, the fifth gear unit including a seventeenth gearwheel and a ninth clutch;
the layshaft including an eighteenth gearwheel;
when the ninth clutch and the fifth clutch are actuated, torque is transmitted from the layshaft to the output shaft via the eighteenth gearwheel in engagement with the seventeenth gearwheel.

* * * * *